(12) United States Patent
Tamizkar

(10) Patent No.: US 11,888,741 B2
(45) Date of Patent: Jan. 30, 2024

(54) MANAGEMENT OF NETWORK ADDRESSES

(71) Applicant: Telia Company AB, Solna (SE)

(72) Inventor: Babak Tamizkar, Stockholm (SE)

(73) Assignee: TELIA COMPANY AB, Solna (SE)

( * ) Notice: Subject to any disclaimer, the term of this patent is extended or adjusted under 35 U.S.C. 154(b) by 32 days.

(21) Appl. No.: 17/178,988

(22) Filed: Feb. 18, 2021

(65) Prior Publication Data

US 2021/0258255 A1    Aug. 19, 2021

(30) Foreign Application Priority Data

Feb. 19, 2020  (FI) ...................................... 20205168

(51) Int. Cl.
  *H04L 45/745*  (2022.01)
(52) U.S. Cl.
  CPC .................................. *H04L 45/745* (2013.01)
(58) Field of Classification Search
  CPC .................................................... H04L 45/745
  See application file for complete search history.

(56) References Cited

U.S. PATENT DOCUMENTS

| | | | | |
|---|---|---|---|---|
| 2009/0182854 A1* | 7/2009 | Sun | ....................... | H04L 49/351 709/223 |
| 2011/0149969 A1* | 6/2011 | Beecroft | ............... | H04L 49/351 370/392 |
| 2013/0034095 A1* | 2/2013 | Miyazaki | ................ | H04L 45/74 370/389 |
| 2013/0182721 A1* | 7/2013 | Zhang | ..................... | H04L 45/02 370/475 |
| 2016/0134954 A1* | 5/2016 | Yang | .................. | H04Q 11/0062 398/45 |
| 2018/0248795 A1* | 8/2018 | Nainar | ................ | H04L 12/4641 |

FOREIGN PATENT DOCUMENTS

| | | | |
|---|---|---|---|
| CN | 103684920 A | * | 3/2014 |
| CN | 103684920 | | 4/2018 |
| EP | 2 597 829 | | 5/2013 |

OTHER PUBLICATIONS

FI Search Report for 20205168 dated Sep. 17, 2020, 2 pages.

* cited by examiner

*Primary Examiner* — Oleg Survillo
*Assistant Examiner* — Monishwar Mohan
(74) *Attorney, Agent, or Firm* — NIXON & VANDERHYE

(57) ABSTRACT

Disclosed is a method for managing a MAC address table by a network node, the method including: defining a first running time and a second running time for a timer; and the method further including: receiving a frame; applying the first running time in the timer defined for a source of the received frame in response to a detection that an address of a destination missing in the MAC address table; and applying a second running time in the timer for MAC address of the source of the received frame and in the timer for the MAC address of the destination in response to a detection that the address of the destination is present in the MAC address table. Also disclosed is a network node, a computer program product and a communication system.

20 Claims, 4 Drawing Sheets

MANAGEMENT OF NETWORK ADDRESSES

CROSS-REFERENCE TO RELATED APPLICATIONS

This application claims priority to FI 20205168 filed Feb. 19, 2020, the entire contents of each of which is hereby incorporated by reference.

BACKGROUND OF THE INVENTION

Field of the Invention

The invention concerns in general the technical field of telecommunications. More particularly, the invention concerns a management of network addresses in a communication network.

Description of the Related Art

So-called Open Systems Interconnection model (OSI model) defines conceptually communication functions of a telecommunication system. The model is divided into abstraction layers each serving the layer above it. The layers are defined as physical layer (Layer 1), data link layer (Layer 2), network layer (Layer 3), transport layer physical layer (Layer 4), session layer (Layer 5), presentation layer (Layer 6) and application layer (Layer 7). In each layer at least some aspects relating to a communication between the communicating entities are defined, such as applied communication protocols and similar.

The data link layer i.e. layer 2 in the OSI model provides node-to-node data transfer and defines aspects thereto. More specifically, the data link layer provides aspect relating to a data link between two directly connected nodes. For example, it detects and corrects errors that may occur on the layer below it, i.e. on the physical layer, and it defines a protocol to establish and terminate a connection between two physically connected devices. Still further, it also defines a protocol for flow control between the connected devices. In accordance with an IEEE 802 specification the data link layer is divided into two sub-layers. The first one is so-called Medium Access Control (MAC) layer and the other is so-called Logical Link Control (LLC) layer. The MAC sub-layer is responsible for controlling how devices in a network gain access to a medium and permission to transmit data. The LLC sub-layer, in turn, is responsible for identifying and encapsulating network layer protocols, and for controlling error checking and frame synchronization.

An addressing mechanism between communicating entities in the MAC sub-layer is based so-called MAC addresses. The MAC address may be considered as a unique serial number assigned to a network interface hardware at the time of manufacture. The MAC address itself consist of two portions wherein the first portion is so-called organizationally unique identifier (i.e. identifying the manufactured of the network interface hardware) and the second portion is specific to the network interface hardware. Traditionally MAC addresses are 12-digit hexadecimal numbers.

The MAC addresses are typically used only to direct packets from one device to the next device. It means that the MAC address of a network adapter, or a network device, travels in the network only until the next device along the way. For example, a computer's MAC address only reaches a router, but it does not go further than that. In other words, the MAC address just gets the data packet to the next device which is contrary to an IP address which is responsible for getting data packet to the ultimate destination.

In view of data traffic data packets are advantageously transmitted only between those the network devices being relevant in enabling the communication between the communicating terminal devices. In order to achieve this so-called MAC address learning procedure is applied thereto. The MAC address learning procedure refers to a way how network nodes residing in the communication network maintain MAC addresses they need in the communication in so-called MAC address tables. In other words, network devices implementing so-called switching maintain the MAC address table to be used for forwarding frames when applicable. The standard MAC address learning procedure is now described by referring to FIG. 1A illustrating schematically a simplified network structure wherein a switch 110 is arranged to direct traffic between a plurality of terminal devices 120A, 120B, 120C. Now, the terminal device A 120A is sending data meant for the terminal device B 120B and, thus, it creates an Ethernet frame 130 into which a source MAC address (i.e. the MAC address of the terminal device A 120A) and a destination MAC address (i.e. the MAC address of the terminal device B 120B) are defined. In response to a receipt of the frame the switch 110 inserts a MAC address of the source (i.e. the terminal device A 120A) in the MAC address table 140. Since the switch is not aware of MAC addresses of the other terminal devices 120B, 120C, i.e. where the terminal device B 120B defined as the destination of the frame resides, the switch broadcasts, or floods out, the frame to all interfaces in has except the one from where the frame came from. This means that both the terminal device B 120B and the terminal device 120C receive the frame. The terminal device B 120B determines from the frame that it is the destination of the frame and, thus, receives it. On the contrary, the terminal device C 120C discards the frame since it is not the recipient of the frame based on the destination address defined in the frame 130. Now, the terminal device B 120B may responds to the terminal device A 120A by generating a new Ethernet frame defining itself as the source and the terminal device A 120A as the destination with the respective MAC addresses. In response to a receipt of the response frame from the terminal device B 120B by the switch, the switch learns the MAC address of the terminal device B 120B and updates the MAC address table 140 accordingly. Since the MAC address table 140 comprise data defining the MAC address of the terminal device A 120A, the response frame from the terminal device B 120B is not broadcast to other terminal devices, such as the terminal device C 120C, but directed to the terminal device A 120A. In the described manner the switch 110 learns the entities being active in communication through it.

A challenge in the existing communication networks is that the MAC address tables have limited capacity i.e. how many entries the table may maintain at a time. The capacity is a device specific and decided by the manufacturer. Typically, the capacity is between 1000 and 3000. If a MAC address table of a network node is full at a time that a new entry is to be updated in the table, the oldest MAC address is replaced with the new MAC address. Moreover, in order to control and manage a number of entries in the MAC address table there is arranged so-called aging time for each entry. The aging timer is adjustable, and it operates so that whenever a new MAC address entry is introduced in the MAC address table of a network node, the timer is initiated for the entry in question. The value of the aging time may e.g. be in a range of 10 to 3600 seconds wherein a default value is usually 300 seconds. In response to a detection that the timer runs out, the MAC address entry is removed from the MAC address table. On the other hand, if it is detected that the network node maintaining the MAC address table and the timer for a certain entry receives a frame form the same source as the entry represents, the aging timer is reset and initiated again.

The mechanism to manage the MAC addresses and, hence, the communication between the terminal devices is applied even if there are a plurality of network nodes, such as switching devices, along the communication path. In other words, each network node receives entries to its MAC address table from the network nodes communicating directly with the network node in question. In other words, a network node, cf. a switching device, generates copies of the original frame so as to cause the network nodes to have entries e.g. defining the original sender of the frame in the MAC address table. In this manner the network nodes residing in the communication path learn the communicating terminal devices and the path along which the frames shall be transmitted in order to enable the communication between the terminal devices.

As is derivable from the foregoing description only those network nodes which reside in the communication path between the communicating terminal devices need the information stored in the MAC address table but the MAC addresses of the communicating terminal devices end up to the MAC address tables of other network nodes as well. The information on the MAC addresses in the MAC address tables of irrelevant network nodes occurs until the communication path between the communicating terminal devices is defined to both directions and the frames are delivered in a unicast manner (i.e. a respective network node has a specific and valid source and destination MAC addresses pointing to specific terminal devices). Hence, those network nodes not belonging to the communication path maintain the MAC addresses of the communicating terminal devices only until the aging timer is run out.

The existing mechanism to manage the MAC addresses in the MAC address tables of the network nodes has a drawback especially in a situation in which the number of entries in the MAC address table is full of entries, or close to full, and a significant number of the MAC address entries in a respective network node are so-called passive MAC addresses i.e. a MAC address entry that is imported in a MAC address table of the network node but the network node never uses this to forward a frame toward that. Namely, in such a situation to update the MAC address table by inserting a new MAC address requires a removal of the oldest MAC address entry from the MAC address table. In an advantageous scenario the MAC address to be removed is a passive MAC address, but it may also be an active MAC address (i.e. a MAC address entry in the MAC address table of the network node which is used by the network node at least one time to forward a frame toward that) and then the replacement of the MAC addresses is unnecessary. In even a more undesired situation the MAC address replacing the oldest MAC address in the MAC address table, which is also active, is a passive MAC address from the respective network node point of view. Then in response to a receipt of a unicast frame the respective network node, in response to an inquiry to the MAC address table returning null because the necessary MAC address was just replaced, interprets the unicast frame as an unknown unicast frame (i.e. an unicast frame that does not have an entry in the MAC address table of the network node for the destination MAC address). As a result, the network node generates a broadcast frame which, in turn, regenerates updates of MAC address tables in other network nodes causing possible replacement of active MAC addresses with the passive MAC address.

Hence, the resources of the network nodes are not optimally used, and unnecessary data traffic is caused in the communication network.

Hence, there is need to introduce novel approaches to manage MAC addresses in order to mitigate the drawbacks of the existing solutions at least in part.

SUMMARY OF THE INVENTION

The following presents a simplified summary in order to provide basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An object of the invention is to present a method, a network node, a computer program product and a communication system for managing a MAC address table.

The objects of the invention are reached by a method, a network node, a computer program product and a communication system as defined by the respective independent claims.

According to a first aspect, a method for managing a media access control, MAC, address table by a network node is provided, the method comprising: defining a first running time and a second running time for a timer, the first running time and the second running time being applicable for defining validity times for a media access control, MAC, address in the media access control, MAC, address table; the method further comprising: receiving a frame; applying the first running time in the timer defined for the media access control, MAC, address of a source of the received frame in response to a detection that an address of a destination of the received frame is missing in the media access control, MAC, address table; and applying a second running time in the timer for the media access control, MAC, address of the source of the received frame and in the timer for the media access control, MAC, address of the destination of the received frame in response to a detection that the address of the destination of the received frame is present in the media access control, MAC, address table.

For example, at least one timer applying either the first running time or the second running time may be initiated in response to a transmit of the frame by the network node.

The method may further comprise, for applying the first running time in the timer: detecting that the timer is missing for the media access control, MAC, address of the source of the frame.

Moreover, the method may further comprise, for applying the first running time in the timer: detecting that a value of the timer defined for the media access control, MAC, address of the source of the frame in the media access control, MAC, address table is within the first running time.

The first running time may be defined to be longer than the second running time.

Further, the first running time and the second running time may be distinguishable from each other. For example, the first running time and the second running time may be made distinguishable from each other by defining the first running time and the second running time not to overlap each other by value.

For example, the first running time may be defined to run from 1 to 3 and the second running time may be defined to run from 4 to 300, the values representing time in seconds.

According to a second aspect, a network node for managing a media access control, MAC, address table is provided, the network node comprising: at least one processor; at least one memory including computer program code; the at least one memory and the computer program code configured to, with the at least one processor, cause the network node to perform: define a first running time and a second running time for a timer, the first running time and the second running time being applicable for defining validity times for a media access control, MAC, address in the media access control, MAC, address table; the network node further caused to perform: receive a frame; apply the first running time in the timer defined for the media access control, MAC, address of a source of the received frame in response to a detection that an address of a destination of the received frame is missing in the media access control, MAC, address table; and apply a second running time in the timer for the media access control, MAC, address of the source of the received frame and in the timer for the media access control, MAC, address of the destination of the received frame in response to a detection that the address of the destination of the received frame is present in the media access control, MAC, address table.

For example, the network node may be caused to initiate at least one timer applying either the first running time or the second running time in response to a transmit of the frame by the network node.

The network node may further be caused, for applying the first running time in the timer, to: detect that the timer is missing for the media access control, MAC, address of the source of the frame.

Moreover, the network node may further be caused, for applying the first running time in the timer, to: detect that a value of the timer defined for the media access control, MAC, address of the source of the frame in the media access control, MAC, address table is within the first running time.

The first running time may be defined to be longer than the second running time.

Further, the first running time and the second running time may be distinguishable from each other. For example, the first running time and the second running time may be made distinguishable from each other by defining the first running time and the second running time not to overlap each other by value.

For example, the first running time may be defined to run from 1 to 3 and the second running time is defined to run from 4 to 300, the values representing time in seconds.

According to a third aspect, a computer program product for managing a media access control, MAC, address table is provided which computer program product, when executed by at least one processor, cause a network node to perform the method according to the first aspect in the foregoing description.

According to a fourth aspect, a communication system is provided, the communication system comprising: at least one network node according to the second aspect in the foregoing description.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
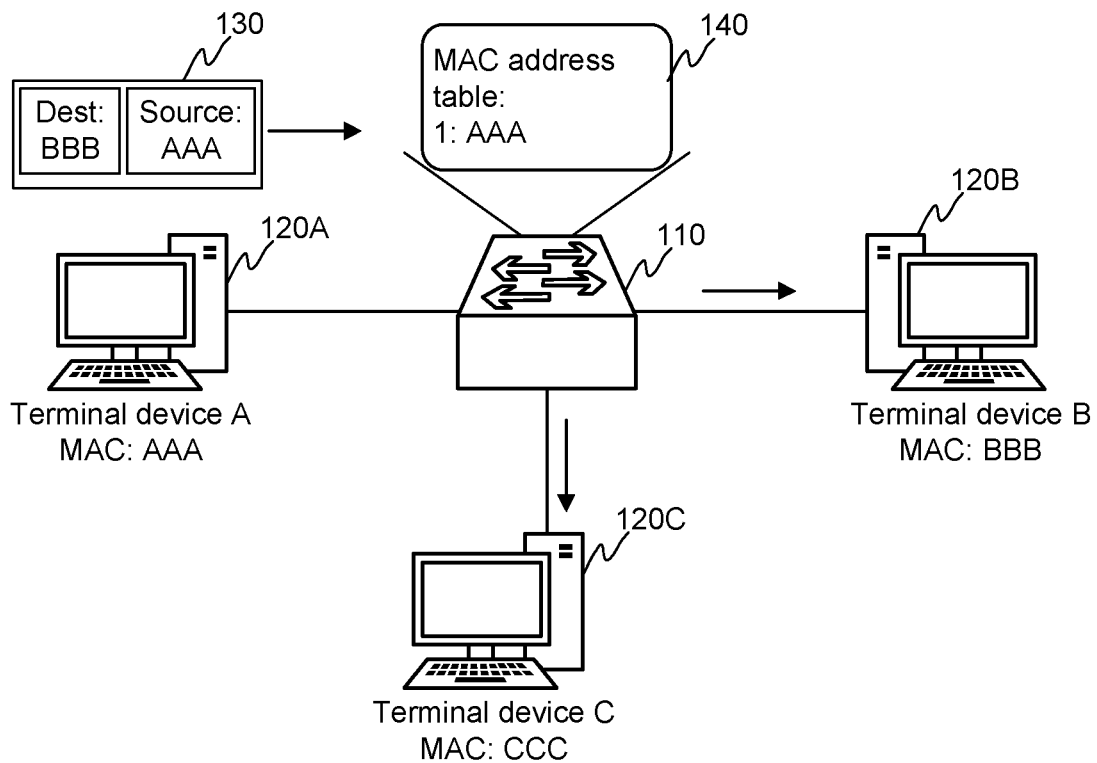
FIGS. 1A and 1B illustrate schematically aspects relating to maintaining information in a media access control, MAC, address table according to prior art.
Figure 1B:
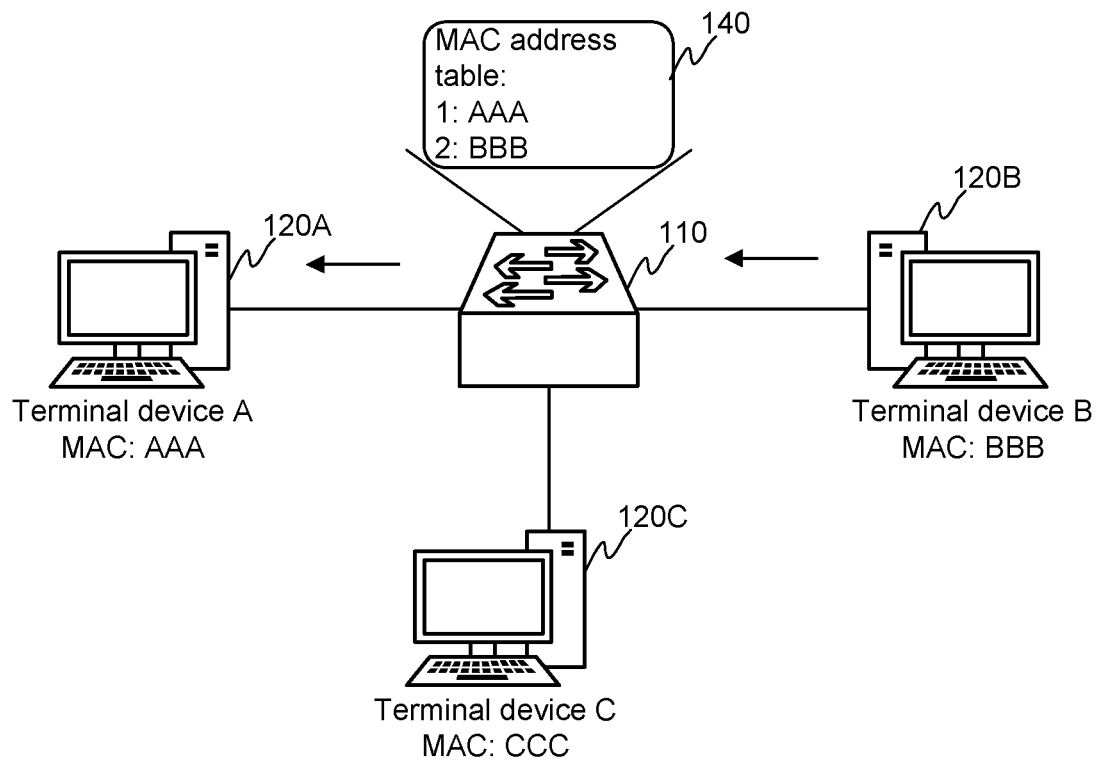
Figure 2:
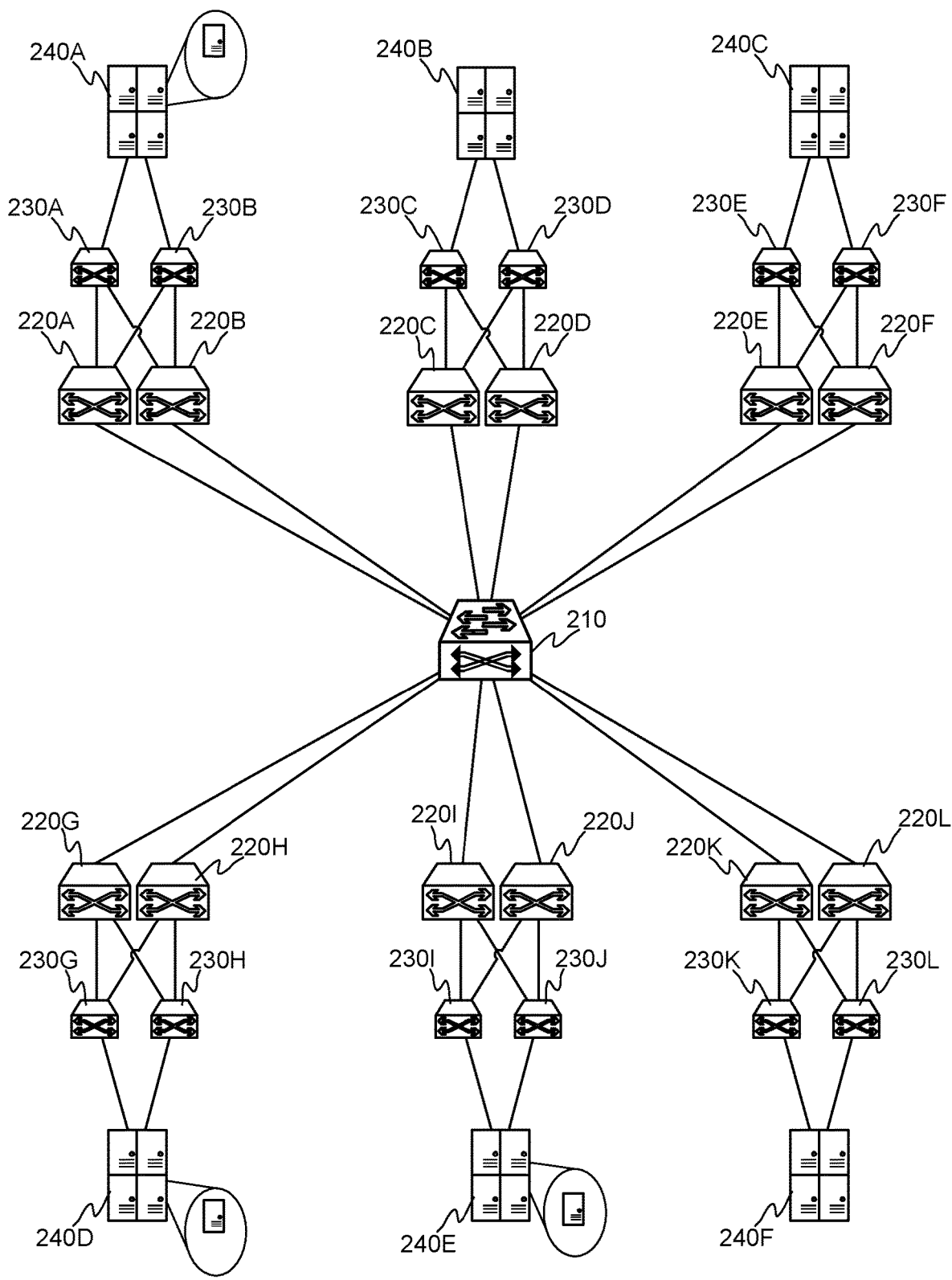
FIG. 2 illustrates schematically a network structure suitable for implementing at least some embodiments according to an embodiment of the invention.

In order to describe at least some aspects of the present invention FIG. 2 is referred to. FIG. 2 illustrates schematically a network structure for implementing OSI layer 2 switching for enabling a communication between terminal devices. The terminal devices in FIG. 2 are illustrated as server devices 240A, 240B, 240C, 240D, 240E, 240F. The server device 240A, 240B, 240C, 240D, 240E, 240F may e.g. be implemented with one or more physical server devices or as virtual machines. The server devices 240A-240F may be connected to the communication network with one or more access switching devices 230A, 230B, 230C, 230D, 230E, 230F, 230G, 230H, 230I, 230J, 230K, 230L. The access switching devices 230A-230L shall also be understood to cover so-called top-of-rack switching devices residing in racks of the server devices. In the non-limiting network implementation of FIG. 2 each server device 240A-240F are connected with two separate connections to two different access switching devices 230A-230L, but naturally another non-limiting network implementation is that each server device 240A, 240B, 240C, 240D, 240E, 240F is connected to only one access switching device 230A-230L. The two separate connections may provide improved reliability to an operation of the communication network and may e.g. be implemented so that for each of the server device 240A-240F the first connection is active and the other is set standby or so that both connections are concurrently active. Further, each access switching device 230A-230L may be connected to two separate aggregate switching devices 220A, 220B, 220C, 220D, 220E, 220F, 220G, 220H, 220I, 220J, 220K, 220L and the aggregate switching devices 220A-220L, in turn, may be connected to one or more core switching devices 210. In the communication network one communication protocol may be applied to so as to control an operation of the network at least in part, such as by performing loop free operations like preventing broadcast/ un-know-unicast storm, frame duplication and MAC address table corruption.

The communication network, and especially the network nodes performing the switching, may be arranged to maintain and manage a MAC address table in the manner as described in the foregoing description. In other words, a network node, such as any of 210, 220A-220L, 230A-230L as schematically illustrated in FIG. 2, may learn a MAC address of a terminal device initiating a communication to another terminal device based on a frame arriving in the network node. The term "terminal device" shall be understood in a broad manner to cover at least user equipment but also server devices 240A-240F as schematically depicted in FIG. 2. As described the learning of the MAC address may be performed by detecting a source MAC address part of the received frame and look-up it from its MAC address table maintained by the network node in question. If look-up returns null (i.e. the source MAC address is not present in the MAC address table), the network node may add the source MAC address and the port number from which the frame arrived into its MAC address table. Contrary to standard procedure in which so-called aging timer is initiated in response to inserting the source MAC address, and other possible pieces of data, in the MAC address table of the network node an improved procedure is performed in accordance with at least some example embodiments of the present invention. Some aspects of the improved procedure, or a method, in accordance with the present invention is schematically illustrated in FIG. 3 and will be described in the following.

Namely, at least some aspects of the present invention relate to defining two running times for a timer which are selectable by a network node configured to perform switching operations in a communication network. The running time refers to a definition providable to the timer by means of which the timer may be aware of a starting time of the timer and an end time of the timer. In accordance with at least some embodiments of the invention the first and the second running time for the timer are defined so that they are distinguishable from each other when the timer is running. This may e.g. be achieved so that the first and the second running times are defined so that they are not overlapping each other. In such an example embodiment the first running time i.e. a range of running may be defined to be so that the timer starts from T0 and is arranged to run to T1, whereas the second timer may start running from T2 and is arranged to run to T3. The ranges of the running times may be defined so that the first running time causes the timer to run a shorter period in time than the second running time. In accordance with the description of the present invention the first running time and the second running time shall be understood so that they can be defined in any manner allowing a detection of an applied running time in the timer. The respective running times for the entries define a period of time the entry in question is maintained in the MAC address table of the network node and, hence, if the timer reaches the end time, the respective entry is deleted from the MAC address table.

Figure 3:
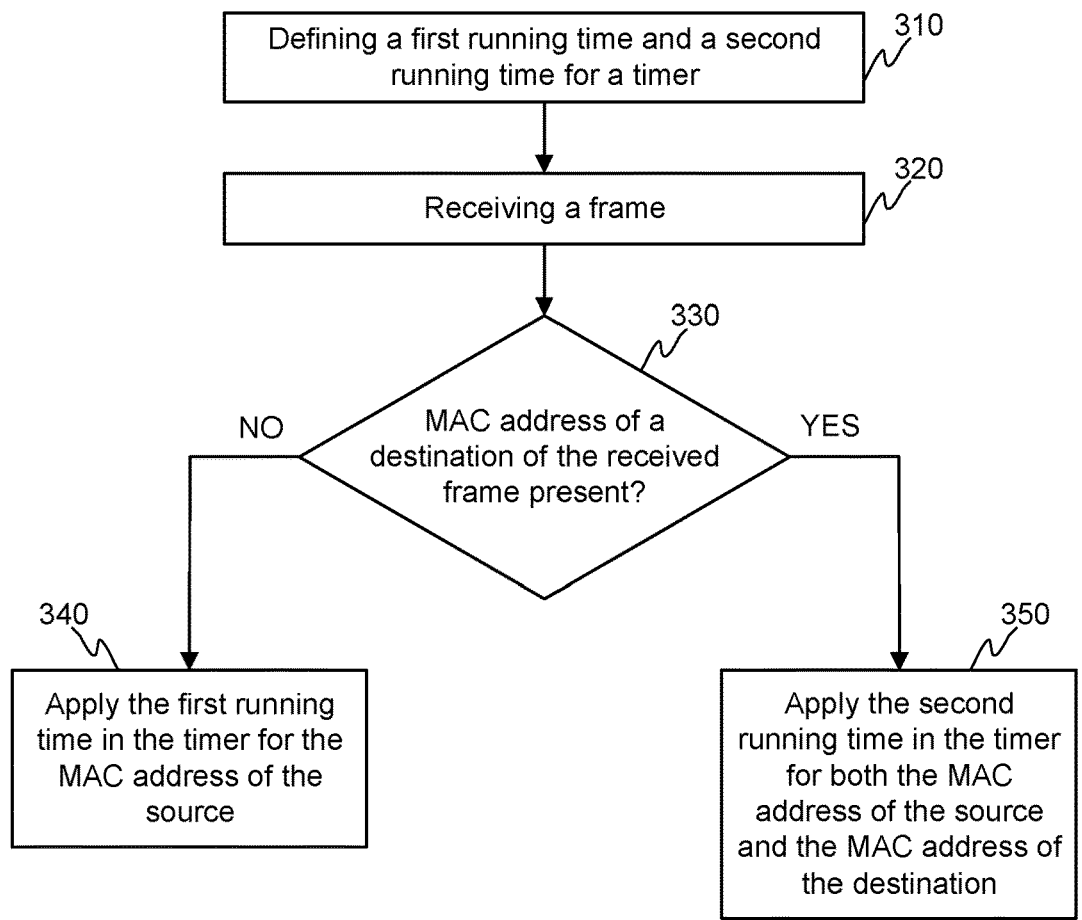
FIG. 3 illustrates schematically a method according to an embodiment of the invention.

Next, at least some aspects of the present invention are described by referring to FIG. 3 illustrating schematically an example of a method according to the present invention. The method of FIG. 3 is illustrated as a procedure implementable by a network node 210, 220A-220L, 230A-230L configured to perform at least switching operations for data frames received by the network node 210, 220A-220L, 230A-230L. As described in the foregoing description the network node 210, 220A-220L, 230A-230L may access to definitions, or parameters, applicable in defining running time for a timer of an entry present in a media access control, MAC, address table maintained by the network node 210, 220A-220L, 230A-230L. In other words, at least a first running time and a second running time selectively applicable by the timer are defined 310. The definitions may e.g. be stored in data storage accessible by the network node 210, 220A-220L, 230A-230L and obtained by the network node 210, 220A-220L, 230A-230L therefrom. The data storage may e.g. refer to an internal memory of the network node 210, 220A-220L, 230A-230L.

At some point a frame is received 320 by the network node 210, 220A-220L, 230A-230L. The network node 210, 220A-220L, 230A-230L is arranged to perform the normal operations with respect to the received frame and, hence, to determine of a presence of media access control, MAC, address of a source of the received frame and the media access control, MAC, address of a destination of the received frame. However, in view of the present invention it is especially determined if the media access control, MAC, address of the destination of the received frame is present in the media access control, MAC, address table or not. This is referred with a reference number 330 in FIG. 3.

Now, in accordance with the example embodiment of the present invention as schematically illustrated in FIG. 3 either a first running time or a second running time is applied in the timer in accordance with the determination in step 330. More specifically, in response to a detection in step 330 that the media access control, MAC, address of the destination of the received frame is missing, i.e. is not present, in the media access control, MAC, address table the first running time is applied 340 in the timer for the media access control, MAC, address of the source of the received frame. Correspondingly, in response to a detection in step 330 that the media access control, MAC, address of the destination of the received frame is present in the media access control, MAC, address table a second running time is applied 350 in the timer for both the media access control, MAC, address of the source of the received frame and the media access control, MAC, address of the destination of the received frame. For sake of clarity it is worthwhile to mention that the timers are run individually for each entry in the media access control, MAC, address table.

In the described manner it is possible to improve an efficiency in a maintenance of information in the MAC address table of the network node through removing at least part of the entries from the MAC address table in another schedule to some other entries.

Figure 4:
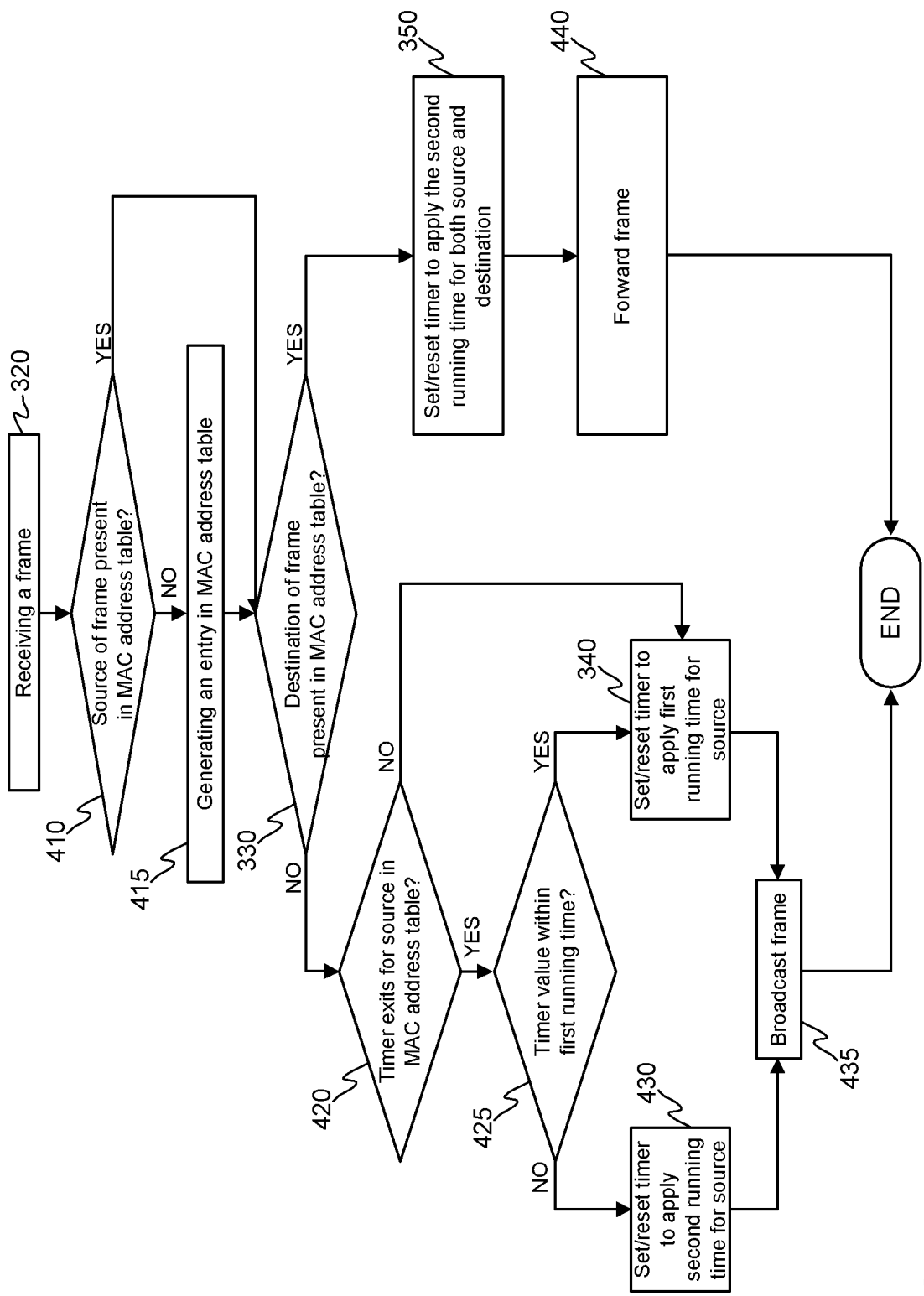
FIG. 4 illustrates schematically a method according to another embodiment of the invention.

Some further aspects relating to the present invention are now described by referring to FIG. 4 illustrating schematically an application of the method of FIG. 3 in a network node 210, 220A-220L, 230A-230L arranged to perform switching operations in a communication network. In other words, FIG. 4 illustrates an embodiment implementing the method of FIG. 3 with further method steps, and especially disclosing more information of a management of a MAC address table in practice. The method schematically illustrated in FIG. 4 starts in response to a receipt 320 of a frame by the network node 210, 220A-220L, 230A-230L. The received frame comprises data indicating at least a media access control, MAC, address of a source of the frame. The source of the frame refers to an entity which has generated the frame to be delivered over the communication network.

The received frame may also comprise data indicating a destination of the frame. In response to a receipt of the frame the network node 210, 220A-220L, 230A-230L is arranged to determine the MAC address of the source from the frame and to determine 410 if the MAC address of the source is present in a MAC address table of the network node or not. In case of detection that the MAC address of the source is present the network node 210, 220A-220L, 230A-230L is arranged to determine the MAC address of the destination of the frame and to determine 330 if the MAC address of the destination is present in the MAC address table. On the other hand, if it is detected in step 410 that the MAC address of the source is not present in the MAC address table, a new entry is generated 415 in the MAC address table of the network node 210, 220A-220L, 230A-230L. The generated entry comprises at least the MAC address of the source but may also comprise other data, such as a port number from which the frame arrived. Moreover, in response to the generation 415 of the entry in the MAC address table, it is determined 330, respectively, if the MAC address of the destination is present in the MAC address table.

Now, in response to a detection in the determination step 330 that the MAC address of the destination of the frame is not present in the MAC address table, it is determined 420 if a timer already exists for the source in the MAC address table. In other words, it is determined 420 if a timer is already running for the entry representing the MAC address of the source of the frame. It may be detected that there is no timer running for the entry in question, e.g. due to that the entry is just generated (cf. step 415), a timer may be set for the entry so that a predefined first running time is applied 340 for the timer. Alternatively, if it is detected in step 420 that there already exists a timer for the source in the MAC address table, it is determined 425 if a value of the timer is within the first running time, i.e. in the range defined by the first running time. As mentioned in the foregoing description the first and the second running times are defined so that they are distinguishable from each other and, hence, the determination of step 425 may be performed. Now, in response to a detection in step 425 that the value of the timer is not within the first running time, it means that the second running time is already applied for the entry representing the MAC address of the source of the frame, and, as a result, the second running time may be reset 430 for the entry in the timer. Alternatively, in step 425 it may be detected that the value of the timer is within the first running time and, as a result, the first running time may be reset and applied 340 again for the entry in question. Finally, in response to either step 430 or step 340 the frame is broadcast 435 by the network node 210, 220A-220L, 230A-230L. The broadcast 435 is performed due to the determination that the MAC address of the destination of the received frame is not present in the MAC address table.

Another outcome of the determination 330 if the MAC address of the destination of the received frame is present in the MAC address table may be that it is present in the MAC address table. In such a situation a second running time is to be applied 350 for both an entry representing the MAC address of the source and an entry representing the MAC address of the destination present in the MAC address table. In other words, the respective timers are instructed to apply the second running time for the mentioned entries. In response to setting, or resetting, the second running time for the respective timers the frame may be forwarded 440 to the destination.

For sake of clarity it shall be understood that the network node 210, 220A-220L, 230A-230L may be configured to maintain the timers individually for each of the entries maintained in the MAC address table wherein either the first running time or the second running time is applied with respect to each entry. In practice the timer may be implemented with a specific computer program product executed for each entry wherein a running time is provided as a parameter for the timer in question. As derivable from the foregoing and forthcoming description according to a non-limiting example embodiment of the invention the first running time and the second running time are advantageously distinguishable from each other. In a non-limiting example, the first running time is defined to run from 1 to 3, whereas the second running time is defined to run from 4 to 300, or alternatively so that the timer counts downwards from 3 to 1 and from 300 to 4 respectively. The mentioned values may represent time in seconds, for example.

Still further, it is worthwhile to mention that the method in accordance with an embodiment of the invention may be performed in each of the network nodes 210, 220A-220L, 230A-230L configured to implement switching operations in the communication network. Hence, the method is performed from the respective network node 210, 220A-220L, 230A-230L point of view.

Figure 5:
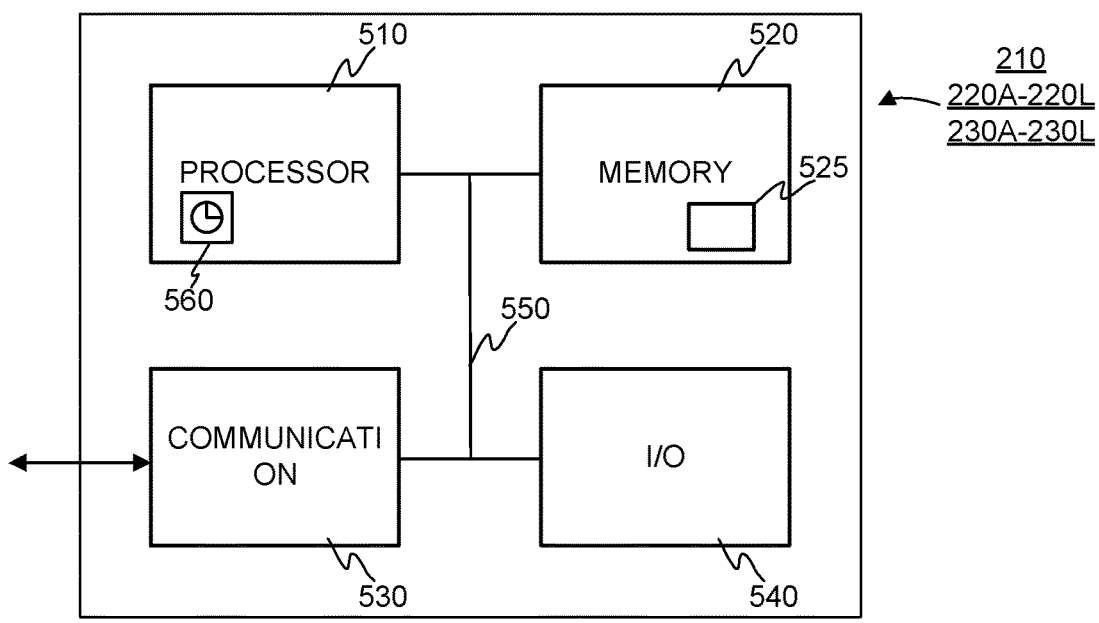
FIG. 5 illustrates schematically a network node according to an embodiment of the invention.

As discussed above, the network node 210, 220A-220L, 230A-230L may perform at least some steps of the method as described operating at least as a switching device in the communication network. FIG. 5 illustrates schematically as a block diagram a non-limiting example of the network node 210, 220A-220L, 230A-230L applicable to perform the method. The block diagram of FIG. depicts some components of an apparatus that may be employed to implement an operation of the network node 210, 220A-220L, 230A-230L. The apparatus comprises a processor 510 and a memory 520. The memory 520 may store data and computer program code 525. The apparatus may further comprise communication means 530 for wired and/or wireless communication with other apparatuses. Furthermore, I/O (input/output) components 540 may be arranged, together with the processor 510 and a portion of the computer program code 525, to provide a user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus may be communicatively coupled to each other via a bus 550 that enables transfer of data and control information between the components. Still further, the processor 510 is advantageously configured to, e.g. by executing a computer program product, implement a timer 560 into which a respective running time is selected and input as a parameter in accordance with some aspects of the invention. Moreover, in some embodiments the timer may be implemented with hardware arrangement. The running times input to the timer as parameters may advantageously be stored in the memory 520.

The memory 520 and a portion of the computer program code 525 stored therein may be further arranged, with the processor 510, to cause the apparatus, i.e. the network node 210, 220A-220L, 230A-230L, to perform a method as described in the foregoing description. The processor 510 may be configured to read from and write to the memory 520. Although the processor 510 is depicted as a respective single component, it may be implemented as respective one or more separate processing components. Similarly, although the memory 520 is depicted as a respective single component, it may be implemented as respective one or more separate components, some or all of which may be integrated/removable and/or may provide permanent/semi-permanent/dynamic/cached storage.

The computer program code 525 may comprise computer-executable instructions that implement functions that correspond to steps of the method as will be described when loaded into the processor 510. As an example, the computer program code 525 may include a computer program consisting of one or more sequences of one or more instructions. The processor 510 is able to load and execute the computer program by reading the one or more sequences of one or more instructions included therein from the memory 520. The one or more sequences of one or more instructions may be configured to, when executed by the processor 510, cause the apparatus to perform the method be described. Hence, the apparatus may comprise at least one processor 510 and at least one memory 520 including the computer program code 525 for one or more programs, the at least one memory 520 and the computer program code 525 configured to, with the at least one processor 510, cause the apparatus to perform the method as described.

The computer program code 525 may be provided e.g. a computer program product comprising at least one computer-readable non-transitory medium having the computer program code 525 stored thereon, which computer program code 525, when executed by the processor 510 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Still further, the computer program code 525 may comprise a proprietary application, such as computer program code for executing the management of the MAC address table in the manner as described.

Any of the programmed functions mentioned may also be performed in firmware or hardware adapted to or programmed to perform the necessary tasks.

For sake of clarity it is worthwhile to mention that network entities operating as sources (240A, 240B, 240C, 240D, 240E, 240F) of data frames and destinations (240A, 240B, 240C, 240D, 240E, 240F) of data frames, i.e. the respective terminal devices, may be implemented with corresponding components as the network nodes and arranged to operate so that they are suitable for transmitting and receiving frames on OSI layer 2. Hence, the source and the destination may refer to user equipment and/or server devices operating as end points of the communication from at least one network node point of view.

The present invention provides a way to manage a MAC address table of a network node 210, 220A-220L, 230A-230L in an efficient way and mitigate a risk of removing active entries from the MAC address table due to limited capacity to maintain the MAC addresses in the MAC address table. The arrangement in which the running time of the first timer is shorter than the running time of the second timer improves a removal of such entries from the MAC address table that are not used (i.e. are passive) and in that manner make room in the MAC address table for active entries. Consequently, it may allow using a smaller MAC address tables in size. Generally speaking, the described method improves an operation of the communication network and the network nodes therein.

In order to increase understanding about the advantages of the present invention the following remarks are given.

Namely, when a MAC address table gets full, the network node has to remove some entries. This, in turn, may increase broadcast in the network because those removed entries look as unknowunicast for the network node and it has to broadcast to reach them. The more it is broadcast the more latency and the more waste of bandwidth occurs.

Another advantage of the present invention is that it may address one of the famous attacks in communication networks called "MAC address flooding or MAC address table overflow". In this kind of attack type, an attacker starts sending many frames to the network node performing switching operations with fake source MAC address. Switch has to learn all these source MAC addresses while very quickly its MAC address table gets full. As a result, the network node starts broadcasting the frames to the communication network which is an issue itself. Besides of that, any other real communication in the network get hold or happens very slowly because the network node cannot response to the real requests but is overloaded with "fake" requests. Even worse is that when the network node starts broadcasting all frames to every-where, the attacker may sit somewhere in the communication network and listen to all communication because there is no more one-to-one communication.

Still further, the present invention provides an improvement in environments in which virtual machines are applied to. Since the virtual machines are used more and more in the communication network, the network nodes configured to perform switching operations needs to have bigger MAC address table in order to manage all the virtual machines and their communication. This means that more resources are needed from the network nodes. Besides, having a big MAC address table it may cause slowness to fetch an entry.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for managing a media access control (MAC) address table maintained by a network node, the method performed by the network node and comprising:

defining a first running time and a second running time for a timer, the first running time and the second running time specifying validity times for a MAC address in the MAC address table;

receiving a frame, where a MAC address of a source of the received frame is present in the MAC address table;

detecting whether a MAC address of a destination of the received frame is present in the MAC address table;

applying the first running time to the timer of the MAC address of the source of the received frame, in response to detecting that the MAC address of the destination of the received frame is missing in the MAC address table; and applying the second running time to the timer of the MAC address of the source of the received frame and to the timer of the MAC address of the destination of the received frame, in response to detecting that the MAC address of the destination of the received frame is present in the MAC address table.

2. The method of claim 1, wherein at least one timer applying either the first running time or the second running time is initiated in response to a transmission of the frame by the network node.

3. The method of claim 2, the method further comprising, for applying the first running time to the timer:

detecting that a value of the timer of the MAC address of the source of the frame in the MAC address table is within the first running time.

4. The method of claim 1, the method further comprising, for applying the first running time to the timer:
detecting that the timer is missing for the MAC address of the source of the frame.

5. The method of claim 1, the method further comprising, for applying the first running time to the timer:
detecting that a value of the timer of the MAC address of the source of the frame in the MAC address table is within the first running time.

6. The method of claim 1, wherein the first running time is defined to be shorter than the second running time.

7. The method of claim 1, wherein the first running time and the second running time are distinguishable from each other.

8. The method of claim 7, wherein the first running time and the second running time are made distinguishable from each other by defining the first running time and the second running time not to overlap each other by value.

9. The method of claim 1, wherein the first running time is defined to run from one to three seconds, and the second running time is defined to run from four to three hundred seconds.

10. A non-transitory computer-readable medium on which is stored a computer program which, when executed by at least one processor of a network-connected device, causes the network-connected device to perform the method of claim 1.

11. A network node for managing a media access control (MAC) address table, the network node comprising:
at least one processor; and
at least one memory, in communication with the at least one processor and having computer program code stored therein,
the computer program code configured to, upon execution by the at least one processor, cause the network node to:
define a first running time and a second running time for a timer, the first running time and the second running time being applicable for defining validity times for a MAC address in the MAC address table;
receive a frame, where a MAC address of a source of the received frame is present in the MAC address table;
detect whether a MAC address of a destination of the received frame is present in the MAC address table;
apply the first running time to the timer of the MAC address of the source of the received frame, in response to a detection that the MAC address of the destination of the received frame is missing in the MAC address table; and
apply the second running time to the timer of the MAC address of the source of the received frame and to the timer of the MAC address of the destination of the received frame, in response to a detection that the MAC address of the destination of the received frame is present in the MAC address table.

12. The network node of claim 11, wherein the computer program code is further configured to initiate at least one timer applying either the first running time or the second running time in response to a transmission of the frame by the network node.

13. The network node of claim 12, the network node further caused, for applying the first running time to the timer, to:
detect that the timer is missing for the MAC address of the source of the frame.

14. The network node of claim 11, the computer program code is further configured, for applying the first running time to the timer, to:
detect that the timer is missing for the MAC address of the source of the frame.

15. The network node of claim 11, the computer program code is further configured, for applying the first running time to the timer, to:
detect that a value of the timer of the MAC address of the source of the frame in the MAC address table is within the first running time.

16. The network node of claim 11, wherein the first running time is defined to be shorter than the second running time.

17. The network node of claim 11, wherein the first running time and the second running time are distinguishable from each other.

18. The network node of claim 17, wherein the first running time and the second running time are made distinguishable from each other by defining the first running time and the second running time not to overlap each other by value.

19. The network node of claim 11, wherein the first running time is defined to run from one to three seconds, and the second running time is defined to run from four to three hundred seconds.

20. A communication system comprising:
a network node that manages a media access control (MAC) address table, the network node comprising:
at least one processor; and
at least one memory, in communication with the at least one processor and having computer program code stored therein,
the computer program code configured to, upon execution by the at least one processor, cause the network node to:
define a first running time and a second running time for a timer, the first running time and the second running time being applicable for defining validity times for a MAC address in the MAC address table;
receive a frame, where a MAC address of a source of the received frame is present in the MAC address table;
detect whether a MAC address of a destination of the received frame is present in the MAC address table;
apply the first running time to the timer of the MAC address of the source of the received frame, in response to a detection that the MAC address of the destination of the received frame is missing in the MAC address table; and
apply the second running time to the timer of the MAC address of the source of the received frame and to the timer of the MAC address of the destination of the received frame, in response to a detection that the MAC address of the destination of the received frame is present in the MAC address table.

\* \* \* \* \*